(12) United States Patent
Peek et al.

(10) Patent No.: US 12,064,994 B2
(45) Date of Patent: Aug. 20, 2024

(54) CART WHEEL SNAP LOCK DEVICE

(71) Applicant: Cascade Engineering, Inc., Grand Rapids, MI (US)

(72) Inventors: Richard T. Peek, Caledonia, MI (US); Jason R. Mulder, Zeeland, MI (US); Linda R. Umlor, Wyoming, MI (US)

( * ) Notice: Subject to any disclaimer, the term of this patent is extended or adjusted under 35 U.S.C. 154(b) by 721 days.

(21) Appl. No.: 17/350,186

(22) Filed: Jun. 17, 2021

(65) Prior Publication Data

US 2022/0402298 A1 Dec. 22, 2022

(51) Int. Cl.
*B60B 27/06* (2006.01)
*B60B 3/00* (2006.01)
*B60B 7/00* (2006.01)
*B60B 7/06* (2006.01)
*B60B 37/10* (2006.01)

(52) U.S. Cl.
CPC ............ *B60B 27/065* (2013.01); *B60B 3/001* (2013.01); *B60B 7/0013* (2013.01); *B60B 7/063* (2013.01); *B60B 37/10* (2013.01); *B60B 2200/41* (2013.01); *B60B 2310/306* (2013.01)

(58) Field of Classification Search
CPC ..... B60B 27/065; B60B 3/001; B60B 7/0013; B60B 7/063; B60B 37/10; B60B 2200/41
See application file for complete search history.

(56) References Cited

U.S. PATENT DOCUMENTS

| | | | | |
|---|---|---|---|---|
| 6,508,518 B1 * | 1/2003 | Owen | ..................... | B60B 37/10 301/111.03 |
| 7,445,297 B2 * | 11/2008 | Mercier | .................. | B60B 3/142 301/121 |
| 8,444,228 B2 * | 5/2013 | Parker | ..................... | B60B 37/10 301/111.03 |
| 8,764,122 B1 * | 7/2014 | Chalk | ....................... | B60B 5/02 301/121 |
| 8,944,524 B1 * | 2/2015 | Sheefel | .................. | B60B 37/10 301/111.01 |
| 9,290,048 B2 | 3/2016 | Nolet et al. | | |
| 10,427,456 B2 | 10/2019 | Morris et al. | | |
| 11,173,743 B2 * | 11/2021 | Ramirez | ................... | B60B 7/08 |
| 2012/0074663 A1 * | 3/2012 | Parker | .................. | B65F 1/1473 301/111.01 |
| 2020/0276860 A1 * | 9/2020 | Ferguson | ................ | B60B 7/066 |

* cited by examiner

*Primary Examiner* — Scott A Browne
(74) *Attorney, Agent, or Firm* — Warner Norcross + Judd LLP

(57) ABSTRACT

A snap lock device for securing a wheel assembly to an axle is provided. The snap lock device may be formed from one integral piece. The snap lock device may include a hubcap and a first and second clip extending from the hubcap. The first and second clips may include a spring, an engagement member, and an actuator. The spring may be directly coupled to the hubcap. The snap lock device may be installed in the wheel assembly by inserting the cap assembly in the wheel assembly such that the first and second clip are placed in two apertures of a wheel and the springs bias the engagement members toward a center of a bore defined in the wheel for receiving the axle. The snap lock device can allow for tool-less installation and removal of the axle.

20 Claims, 9 Drawing Sheets

CART WHEEL SNAP LOCK DEVICE

BACKGROUND OF THE INVENTION

The present invention relates to wheel assemblies, and more particularly to cart wheel assemblies that may be assembled and disassembled manually and without tools and may include a snap lock device.

Rolling carts, such as those for trash and recyclables, may include an axle supported by the cart body and wheels mounted on opposite ends of the axle. The wheel and axle assemblies may include components for releasably securing the wheels on the axle. This enables the wheels to be mounted on the carts relatively easily, and to be subsequently removed from the carts relatively easily for replacement or other service.

Tools may be required to assemble some known wheel assemblies. There is an increasing desire for products that are easy to assemble by hand without tools. Snap lock wheel assemblies can provide easy to assemble products because such assemblies may have an axle and a wheel that connect together without the use of any tools. However, these assemblies can be a combination of multiple parts increasing the assembly difficulty and time. Additionally, assemblies with multiple parts increase inventory requirements and the risk of part failure.

SUMMARY OF THE INVENTION

The present invention provides a snap lock device for use with a wheel assembly. The wheel assembly can include a wheel defining a bore adapted for mounting on an axle having a circumferential groove. The wheel assembly may define a plurality of apertures that may include a ramp extending into the apertures. In one embodiment, the snap lock device can be coupled to the wheel assembly through at least two of the plurality of apertures. The snap lock device may form one integral piece including a hubcap, a first clip, and a second clip. The hubcap may have a lower surface and may be configured to cover at least two of the plurality of apertures when the snap lock device is installed in the wheel assembly. The first clip and the second clip may have a similar construction to each other. Both clips can have a spring coupled to the lower surface of the hubcap. The first clip can be coupled to the hubcap along one side of the hubcap and the second clip can be coupled to the hubcap along another side. Each clip may have an engagement member and an actuator coupled to the spring. The actuator may extend laterally from the hubcap. The engagement member can be adapted to fit into the circumferential groove on the axle. When the snap lock device is mounted on the wheel assembly, a portion of the spring may be located below the ramp and the spring may urge the engagement member into the bore. The actuator of each clip can be accessed by a user and can be engaged and moved toward the bore by a user. As the actuator moves toward the bore, the movement of the actuator may result in movement of the engagement members away from the bore.

The snap lock device may be installed in, and removed from, a wheel assembly without the use of tools. The snap lock device can be aligned with two of the plurality of apertures such that the engagement members rest on the bore. Force can be applied to the hubcap to move the snap lock device into the wheel assembly and to retract the engagement members to the sides of the bore. Force may be further applied to the hubcap to further move the snap lock device into the wheel assembly, to move the engagement members into position in an opening of the bore, and to position a crossbar of the spring on the ramp in the aperture. Force can be further applied to the hubcap to complete the installation of the snap lock device within the wheel assembly and to move the crossbar below the ramp.

The snap lock device can provide tool-less assembly of a wheel onto an axle. The bore may be inserted over the axle may such that the axle contacts the engagement members. Force may be applied on the wheel assembly toward the axle to further receive the axle into the bore and to retract the engagement members from the bore. Force may further be applied on the wheel assembly toward the axle to receive the axle within the bore such that a top portion of the axle contacts a terminating end and to align the circumferential groove with the engagement members. The engagement members can be biased toward the bore to be positioned in the circumferential groove.

The snap lock device also can provide tool-less removal of a wheel assembly from an axle. The actuators can be squeezed toward the bore which may cause the engagement members to retract from the circumferential groove of the axle. Force may be applied to the wheel assembly away from the axle to move the engagement members above the circumferential groove. The actuators can be released which may allow the engagement members to move back toward the center of the bore. Now that the axle is no longer secured by the engagement member, force may further be applied to the wheel assembly to remove the wheel assembly from the axle.

These and other advantages and features of the invention will be more fully understood and appreciated by reference to the description of the current embodiment and the drawings.

DESCRIPTION OF THE CURRENT EMBODIMENT

Figure 1:
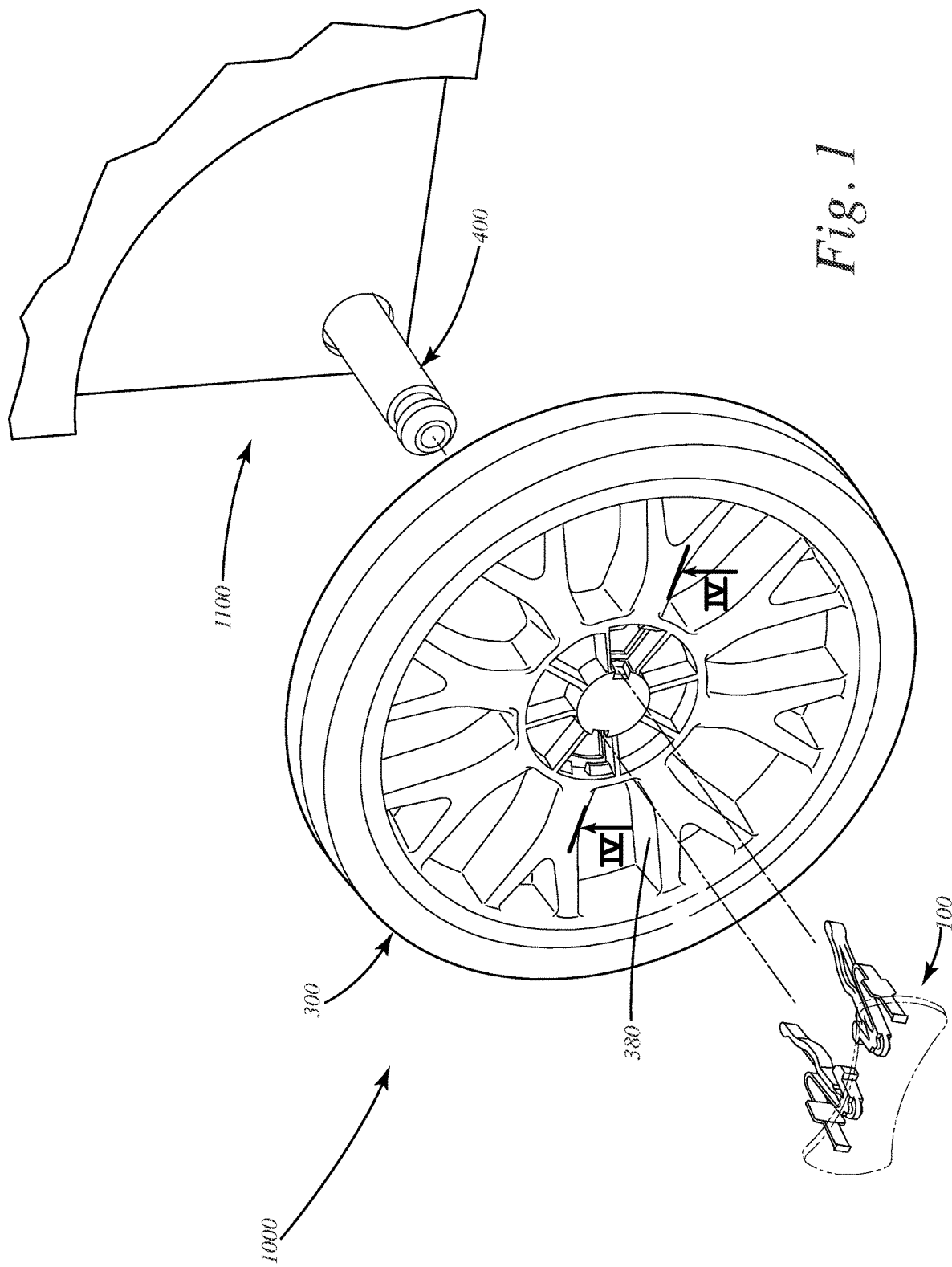
FIG. 1 depicts a perspective exploded view of a cart wheel snap lock assembly according to one embodiment.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

FIG. 1 depicts a perspective exploded view of a cart wheel snap lock assembly 1000 according to one embodiment. The cart wheel snap lock assembly 1000 may include a snap lock device 100, a wheel assembly 300 including a wheel 310, and an axle 400. A portion of the axle 400 is shown extending from an aperture in a lower portion of a cart container 1100. In one embodiment, the cart container 1100 is a rolling trash container or a rolling recycling container. The snap lock device 100, the wheel assembly 300, and the axle 400 are described in more detail below.

This application is an advancement over the construction disclosed in U.S. Pat. No. 8,444,228 issued May 21, 2013 and entitled WHEEL ASSEMBLY FOR TRASH/RECYCLING CART, which is hereby incorporated by reference in its entirety.

Figure 2:
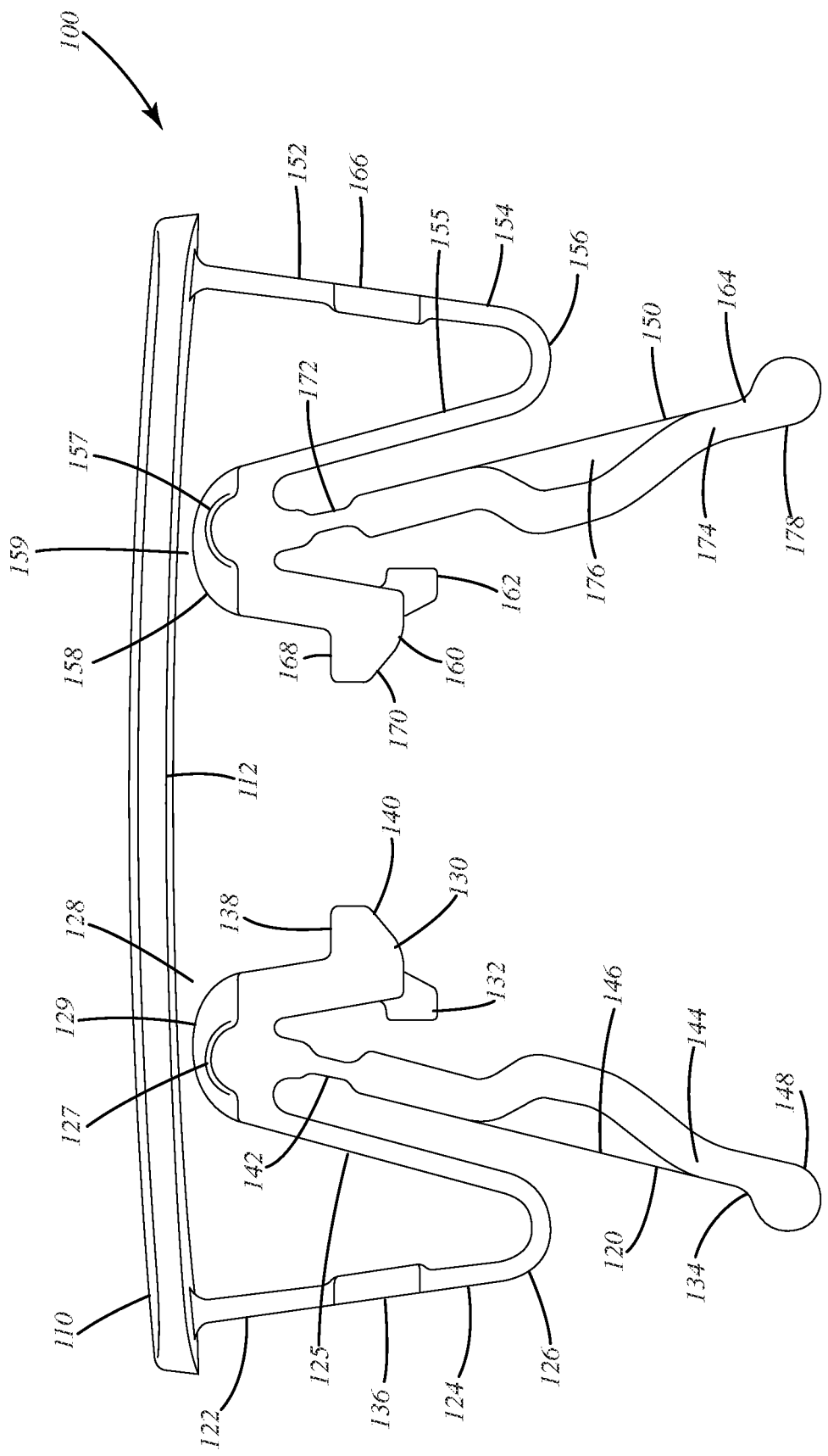
FIG. 2 depicts a front view of a snap lock device according to one embodiment.
Figure 3:
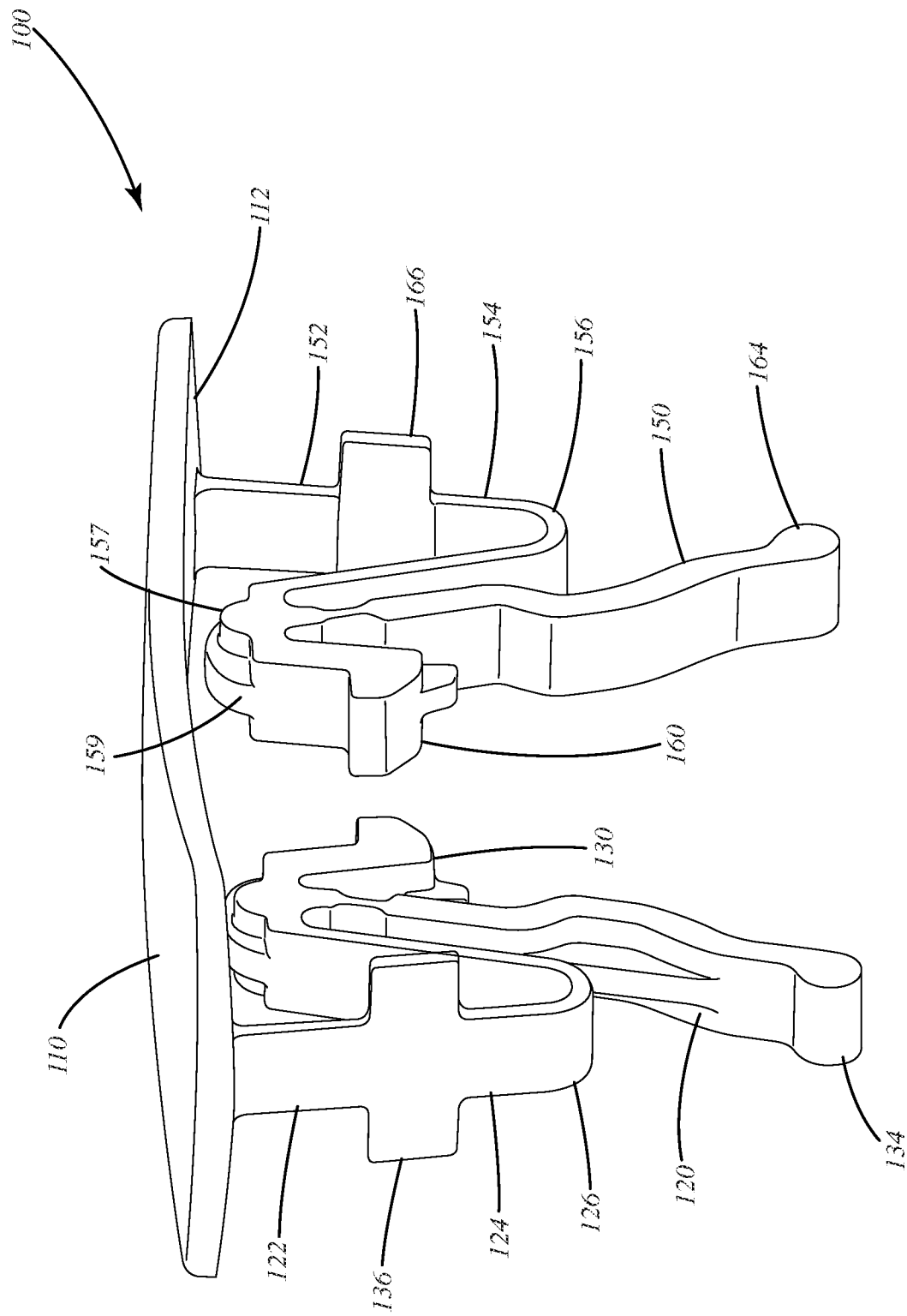
FIG. 3 depicts a perspective view of the snap lock device of FIG. 2.

In FIGS. 2-3, a snap lock device 100 according to one embodiment is shown. The snap lock device 100 may include a hubcap 110 and a first clip 120 and a second clip 150 connected to the hubcap 110 at a lower surface 112. In one embodiment, the first clip 120 and the second clip 150 may be coupled to opposite sides of the hubcap 110. As shown in FIG. 2, the snap lock device 100 may form one integrated piece. By integrating the clips into the hubcap 110, the snap lock device 100 reduces the number of parts necessary to couple the wheel assembly to the axle and eases the construction of the wheel assembly. Each clip 120, 150 can have a spring 122, 152 connected to the hubcap 110. The springs 122, 152 can each have an outer arm 124, 154 extending radially from the lower surface 112 of the hubcap 110, a curved member 126, 156 connecting the outer arm 124, 154 with an inner arm 125, 155, and a top end 128, 158 disposed at the opposite end of the inner arm 125, 155. In one embodiment, the outer arm 124, 154 may be thicker at the end in contact with the hubcap 110 to provide additional stability for the clips 120, 150. In one embodiment, a crossbar 136, 166 may be included in the outer arm 124, 154. The crossbar 136, 166 may help secure the snap lock device 100 to a wheel assembly. In one embodiment, the top end 128, 158 may include a top surface 127, 157 and a top edge 129, 159 protruding from the top surface 127, 157. Each clip 120, 150 may have an engagement member 130, 160 attached to the top end 128, 158. The engagement members may alternatively be referred to as axle catch tabs, keepers, or engagement tabs. The engagement members 130, 160 may extend radially outward from the top end 128, 158. In one embodiment, the engagement members 130, 160 may include a flat engagement surface 138, 168, a tapered engagement surface 140, 170, and at least one locating boss 132, 162.

Each clip 120, 150, may have an actuator 134, 164 extending laterally from the top end 128, 158. The actuators 134, 164 may alternatively be referred to as levers. Moving the actuator 134, 164 toward a center of the snap lock device 100 may cause the engagement members 130, 160 to retract from the center of the snap lock device 100. In one embodiment, movement of the actuators 134, 164 may cause the hubcap 110 to flex such that the hubcap 110 becomes convex. In one embodiment, the actuators 134, 164 may have a thinned section 142, 172, a lever surface 144, 174, a rib 146, 176, and a rounded portion 148, 178. The thinned section 142, 172 may act as a pivot and may allow the actuators 134, 164 to move radially inward toward the center of the snap lock device 100 and radially outward. The rib 146, 176 may protrude from the lever surface 144, 174 and can strengthen the actuators 134, 164 to maintain the substantially straight shape of the actuators 134, 164 while the actuators 134, 164 are moved radially inward and radially outward. As depicted in FIGS. 2-3, the rounded portion 148, 178 may be located at the end of the actuators 134, 164 and can improve the tactile feel to a user when engaging the actuators 134, 164.

The snap lock device 100 may be made of any suitable material including metals, plastics, and composites. The snap lock device 100 may be manufactured by any process suitable for the application including injection molding, compression molding, machining, 3D printing, and metal stamping. In one embodiment, the snap lock device 100 may be manufactured from a flexible material such that the snap lock device 100 can be used with wheel assemblies having axles of different diameters. For example, the snap lock device 100 can be manufactured for use with an axle 400 having a diameter of 0.844" and a diameter of 0.625".

In FIGS. 4A-4D, a method of tool-less installation for a snap lock device 100 in a wheel assembly 300 is shown. The wheel assembly 300 may be adapted for mounting on an axle 400, the axle 400 having a circumferential groove 410. The wheel assembly 300 can include a wheel 310 defining a throughbore (or bore for short) 320 to fit over the axle 400 and a plurality of apertures 330 defined between a plurality of spokes 380 in the wheel 310. The bore 320 may also be referred to as a wheel bore. The apertures 330 may include a ramp 340 to help secure the cap assembly 100 to the wheel assembly 300. The apertures 330 may include a protrusion 370 extending into the aperture to help secure the cap assembly 100 to the wheel assembly 300. In one embodiment, the protrusion 370 may secure the engagement member 130, 160, the locating boss 132, 162, and the actuator 134, 164 to the wheel assembly 300. In an embodiment where the engagement member 130, 160 includes a tapered engagement surface 140, 170, the tapered engagement surface 140, 170 may contact the protrusion 370 when the snap lock device 100 is installed in the wheel assembly 300. The bore 320 may have a terminating end 350 and at least one opening 360.

Figure 4A:
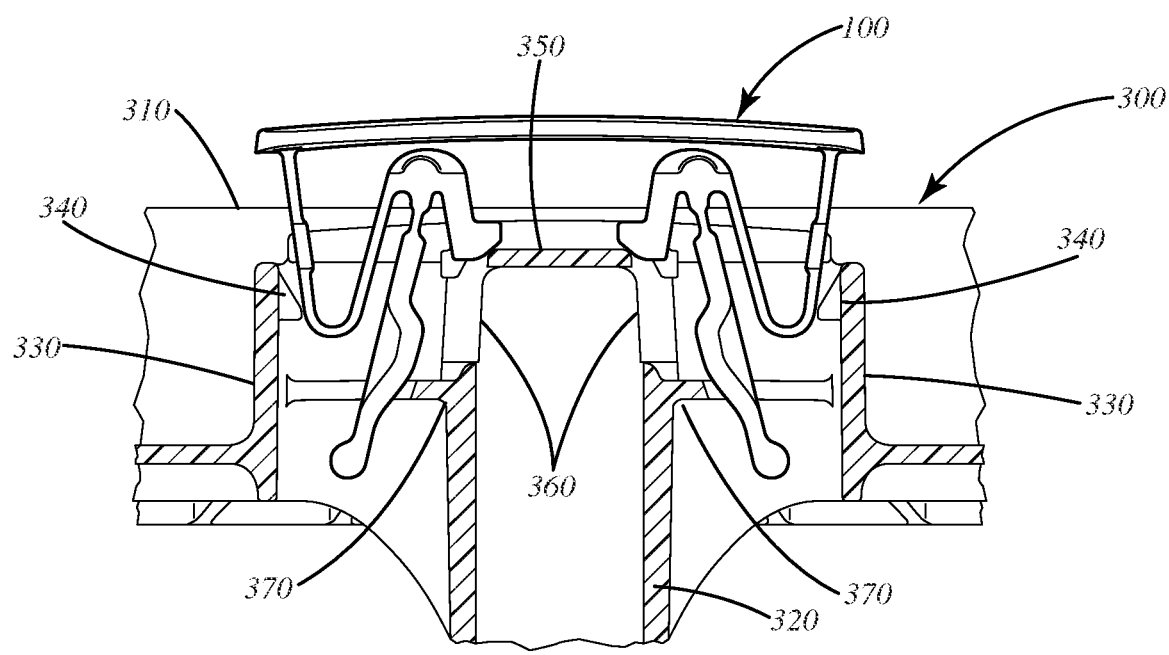
FIGS. 4A-4D depicts a cross-sectional view along line IV-IV of a process of installing a snap lock device into a wheel assembly according to one embodiment.
Figure 4B:
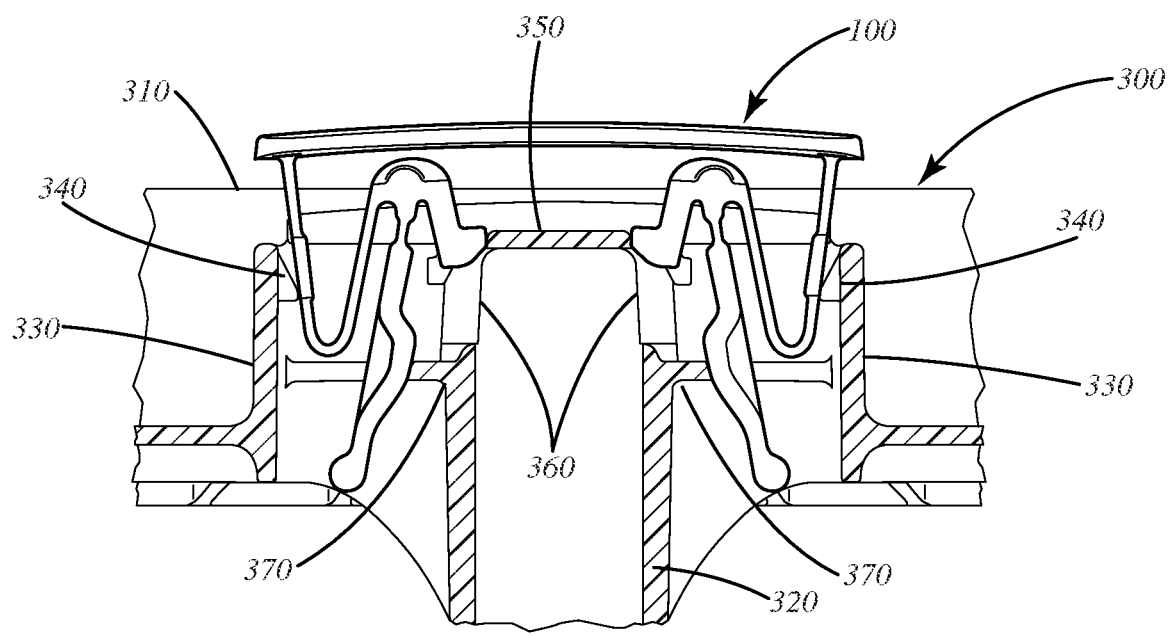
Figure 4C:
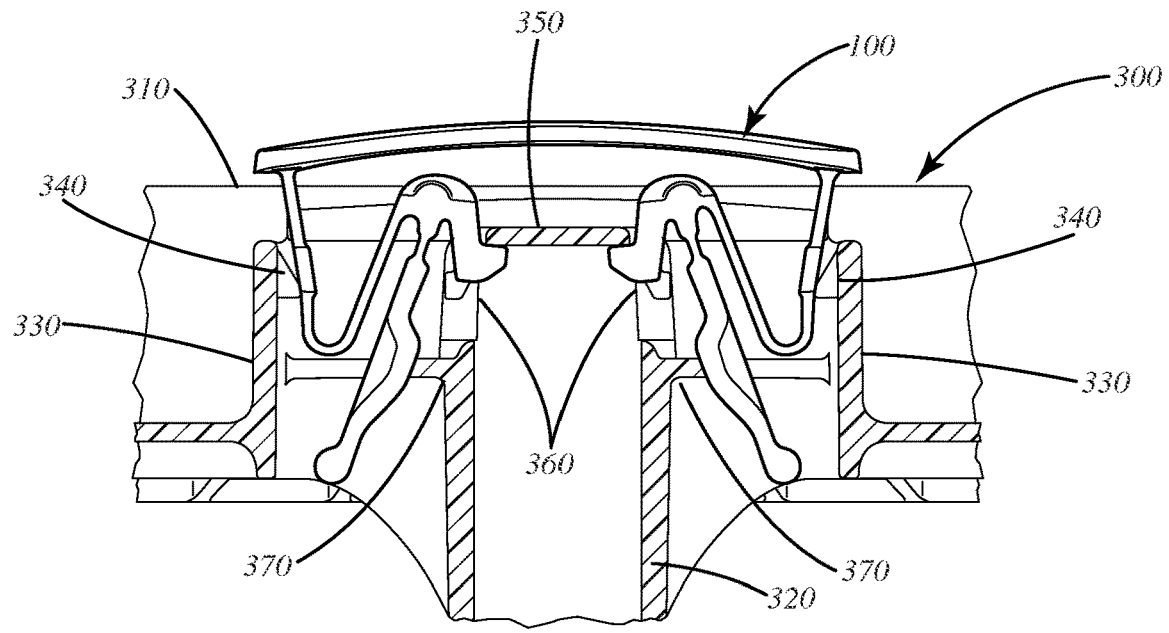
Figure 4D:
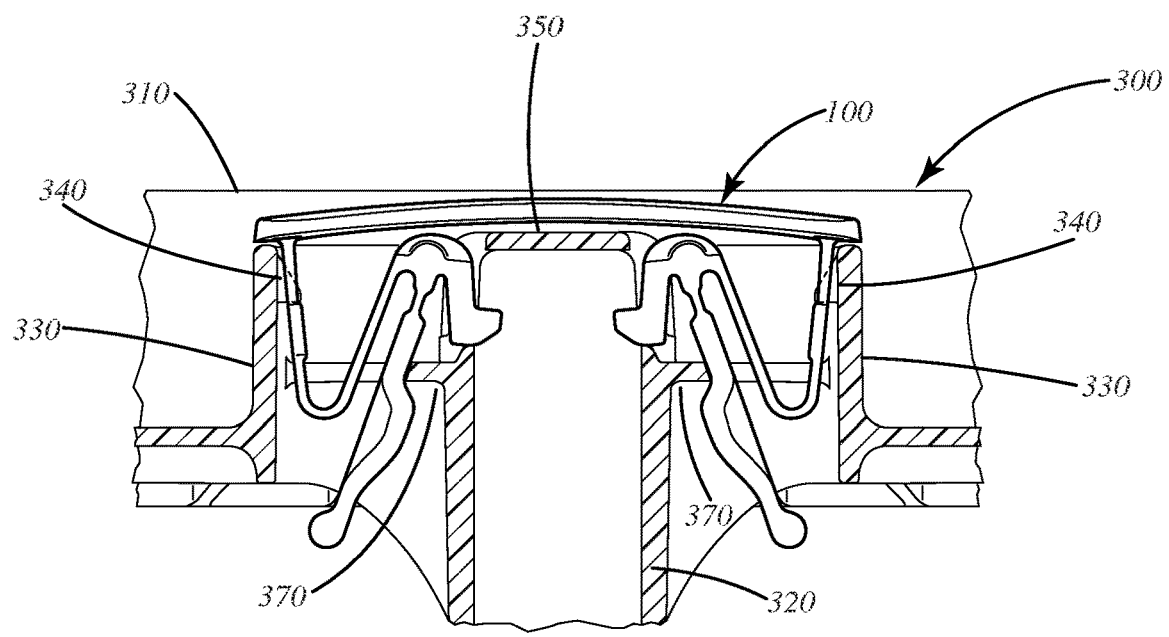

As shown in FIG. 4A, the snap lock device 100 can be aligned with the wheel assembly 300 such that the clips 120, 150 are aligned with two of the apertures 330 of the wheel assembly 300 and the engagement members 130, 160 rest on the terminating end 350. As shown in FIG. 4B, a first force can be applied on the hubcap 110 to move the hubcap 110 toward the wheel assembly 300. The first force may retract the engagement members 130, 160 to the sides of the bore 320. A second force can be applied on the hubcap 110 to move the hubcap 110 closer to the wheel assembly 300. As shown in FIG. 4C, the second force may move the engagement members 130, 160 into the openings 360 in the bore 320. The second force may position the crossbar 136, 166 on the ramp 340 of the aperture 330. Put another way, the second force may cause the crossbar 136, 166 of the spring 122, 152 to engage the ramp 340. A third force can be applied to the hubcap 110 to seat the hubcap 110 on the wheel assembly 300. As shown in FIG. 4D, the third force may move the crossbar 136, 166, below the ramp 340 which may further secure the snap lock device 100 to the wheel assembly 300. Additionally, or alternatively, the crossbar 136, 166 may provide leverage to assist in the axial movement of the actuators 134, 164. The third force may also seat the engagement members 130, 160 and the actuators 134, 164 on the protrusion 370. This can further secure the snap lock device 100 in the wheel assembly 300. In FIG. 4D, the snap lock device 100 is fully installed in the wheel assembly 300. In one embodiment, the first, second, and third forces may all be applied to the snap lock device 100 in one continuous motion. In an alternative embodiment, either the first and second or the second and third force may be applied together with the remaining force applied separately. When the snap lock device 100 is installed in the wheel assembly 300, the resulting assembly may be referred to as a snap lock wheel assembly.

Figure 5A:
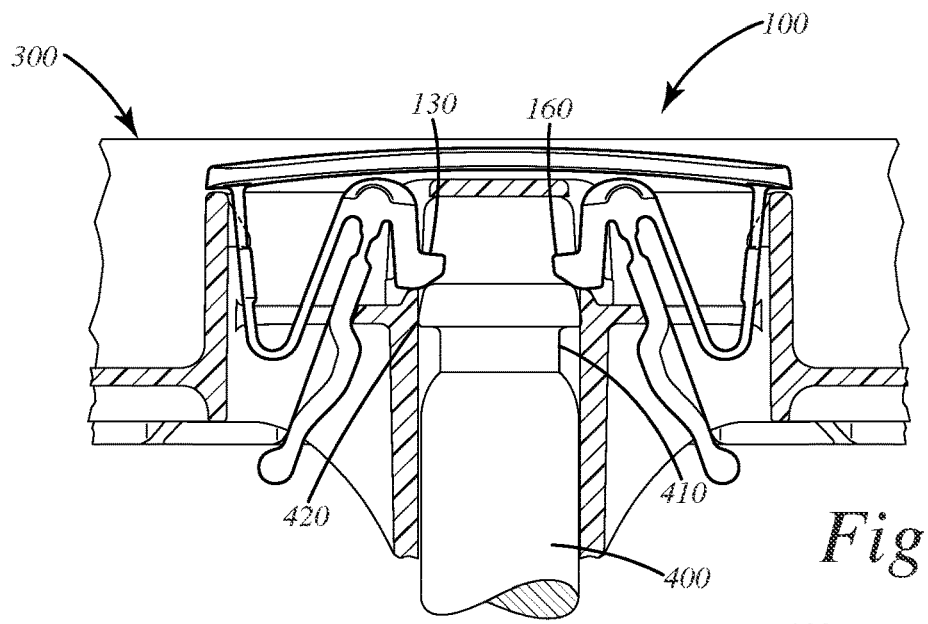
FIGS. 5A-5C depicts a cross-sectional view along line IV-IV of a method of inserting an axle into a wheel assembly including a snap lock device according to one embodiment.
Figure 5B:
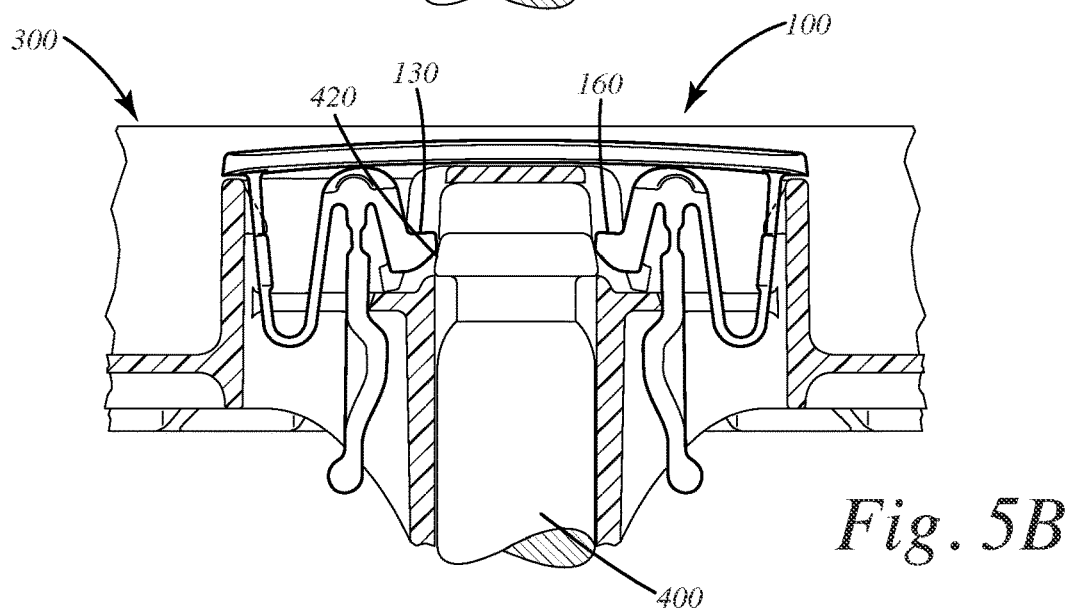
Figure 5C:
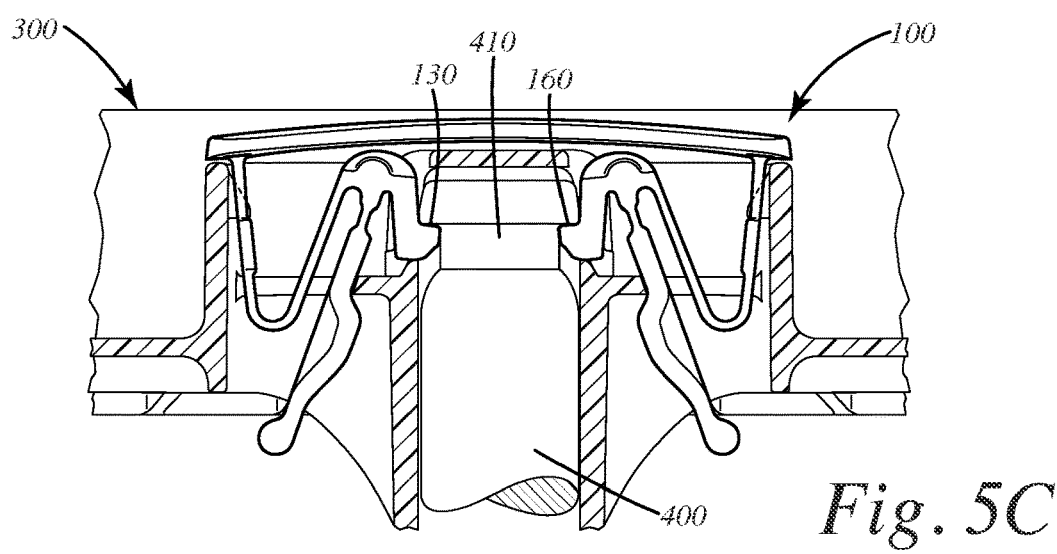

In FIGS. 5A-5C, a method of installing the wheel assembly 300 including the snap lock device 100 onto the axle 400 is shown. As shown in FIG. 5A, the bore 320 may be placed over the axle 400 such that the axle 400 contacts the engagement members 130, 160. A first force can be applied on the wheel assembly 300 toward the axle 400. As shown in FIG. 5B, the first force may move the wheel assembly 300 such that a top portion 420 of the axle 400 aligns with the engagement members 130, 160. The first force can retract the engagement members 130, 160 from the interior of the bore 320. As shown in FIG. 5C, a second force can be applied on the wheel assembly 300 toward the axle 400 such that the top portion 420 contacts the terminating end 350 of the bore 320. The second force may align the circumferential groove 410 with the engagement members 130, 160 which may allow the engagement members 130, 160 to move into the circumferential groove 410. When the engagement members 130, 160 are seated in the circumferential groove 410, the wheel assembly 300 can be secured to the axle 400. Put another way, the wheel assembly 300 and the axle 400 are in a "use position" as shown in FIG. 5C. In one embodiment, the first force and the second force may be applied in one continuous motion. In one embodiment, the engagement members 130, 160 may be capable of producing an audible sound when the engagement members are first positioned in the circumferential groove 410 of the axle 400. The audible sound can notify a user that the axle 400 is properly installed in the wheel assembly 300.

Figure 6A:
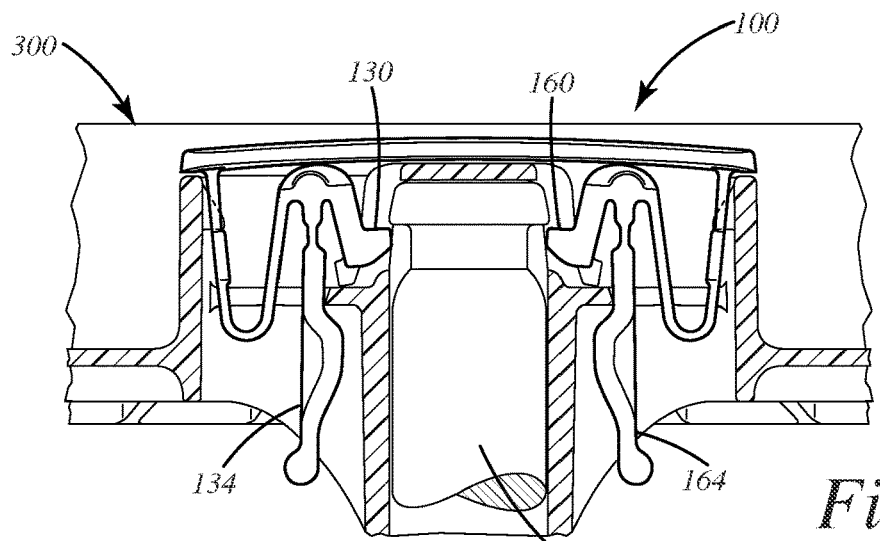
FIGS. 6A-6C depicts a cross-sectional view along line IV-IV of a method of removing an axle from a wheel assembly including a snap lock device according to one embodiment.
Figure 6B:
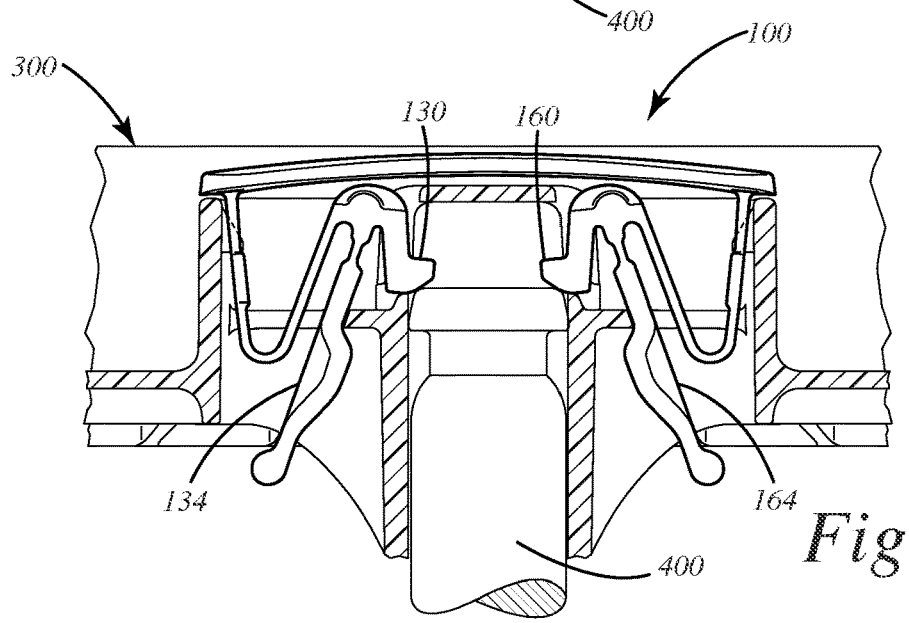
Figure 6C:
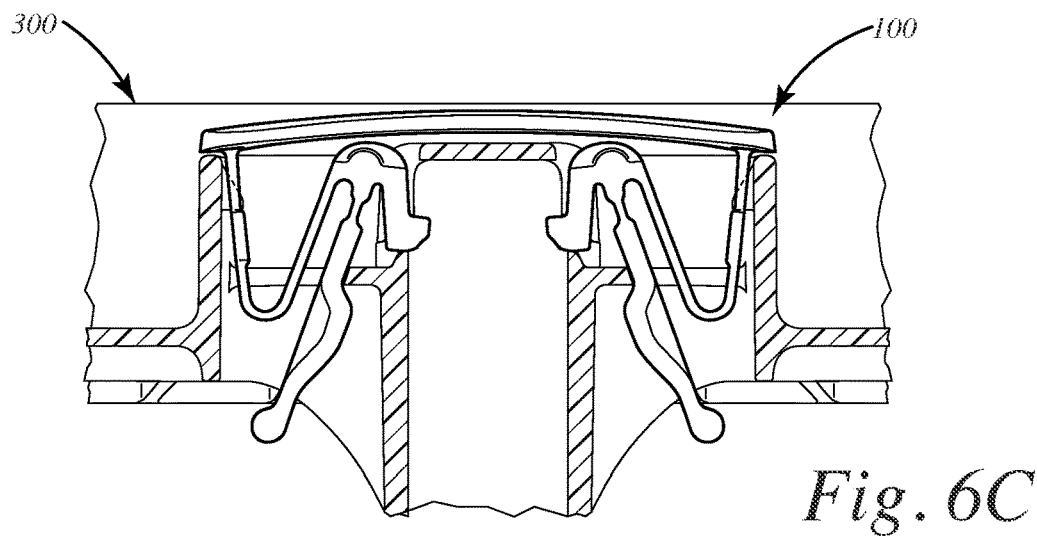

In FIGS. 6A-6C, a method of removing the wheel assembly 300 including the snap lock device 100 from the axle 400 is shown. As shown in FIG. 6A, the actuators 134, 164 can be squeezed toward the bore 320 which may cause the engagement members 130, 160 to retract from the circumferential groove 410 of the axle 400. As shown in FIG. 6B, a first force may be applied on the wheel assembly 300 away from the axle 400 such that the engagement members 130, 160 are moved above a top portion 420 of the axle 400. The actuators 134, 164 may then be released which may cause the engagement members 130, 160 to bias toward the center of the bore 320. As shown in FIG. 6C, a second force may be applied on the wheel assembly 300 away from the axle 400 such that the wheel assembly 300 is removed from the axle 400. In one embodiment, the first force and the second force may be applied as one continuous motion.

Figure 7:
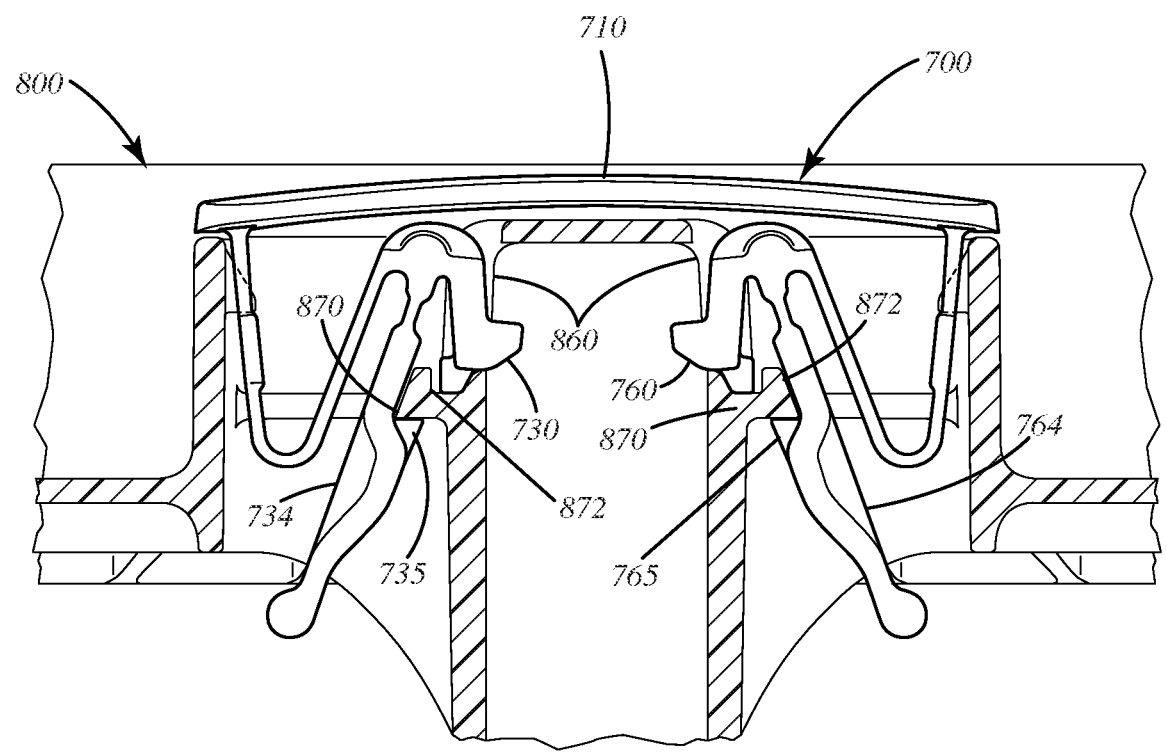
FIG. 7 depicts a cross-sectional perspective view of a snap lock device installed in a wheel assembly according to one embodiment.
Figure 8:
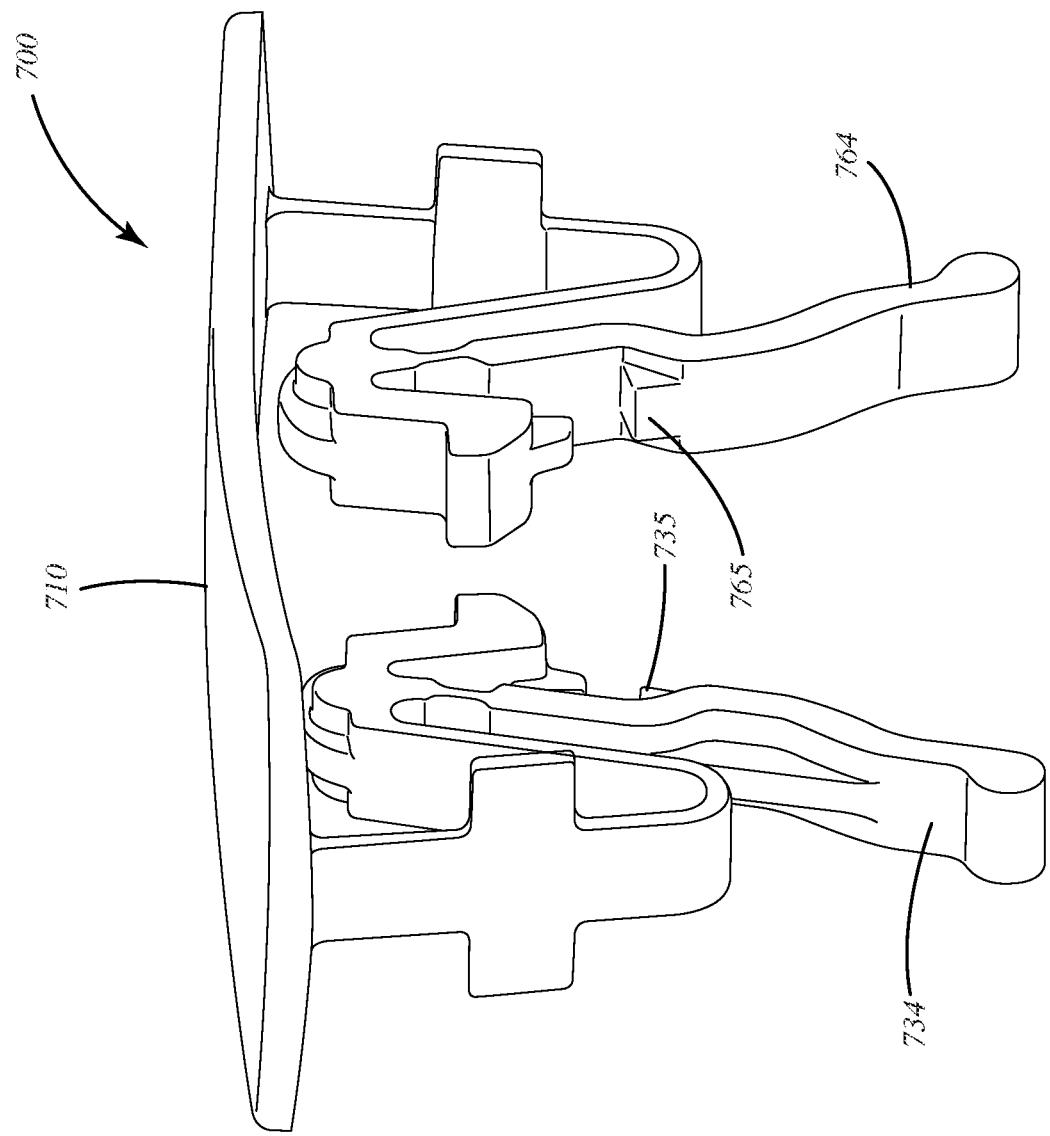
FIG. 8 depicts a perspective view of the snap lock device of FIG. 7.

In FIG. 7, an alternate embodiment of a snap lock device 700 is shown installed in an alternate embodiment of a wheel assembly 800. In FIG. 8, a perspective view of the snap lock device 700 of FIG. 7 is shown. Unless explicitly stated, the snap lock device 700 and the wheel assembly 800 include all components and functionality described above with reference to the snap lock device 100 and the wheel assembly 300 but denoted with a 700 or 800 series component number rather than a 100 or 200 series. In the depicted embodiment of FIG. 7, the actuator 734, 764 includes a catch 735, 765 extending from the actuator 734, 764, toward the hubcap 710. The catch 735, 765 may further secure the snap lock device 700 to the wheel assembly 800 by contacting the protrusion 870. Additionally, or alternatively, the catch 735, 765 can prevent the clip 720, 750 from bending when the wheel assembly 800 is installed on the axle 400. The protrusion 870 may further include a projection 872 extending toward the hubcap 710. The projection 872 can further secure the snap lock device 700 to the wheel assembly 800. In one embodiment, the projection 872 may maintain the contact between the engagement member 730, 760 and the axle 400 when the wheel assembly 800 is removed from the axle 400 by preventing the engagement member 730, 760 from fully exiting opening 860.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the," or "said," is not to be construed as limiting the element to the singular.

The embodiments of the invention in which an exclusive property or privilege is claimed are defined as follows:

1. A cart wheel assembly comprising:
   an axle having a circumferential groove, a wheel defining a bore to receive the axle and a plurality of apertures, the bore having a terminating end and defining at least one opening, at least two of the plurality of apertures each including a ramp extending into the aperture; and
   a snap lock device including:
      a hubcap having a lower surface, the hubcap configured to cover at least two of the plurality of apertures when the snap lock device is installed in the wheel;
      a first clip extending from the lower surface of the hubcap and a second clip extending from the lower surface of the hubcap, wherein the first clip, the second clip, and the hubcap are formed as one integral piece; and
      the first clip and the second clip each including a spring directly coupled to the lower surface of the hubcap, each clip further including an engagement member coupled to the spring, each clip further including an actuator coupled to the spring and extending laterally from the hubcap, the engagement member being adapted to fit into the axle groove,
   wherein, when the snap lock device is mounted to the wheel,
      a portion of the spring of each clip is located below the ramp,
      the spring of each clip urges the engagement member into one of the at least one opening of the bore,
      the actuator of each clip is accessible by a user, and
      the actuator of each clip is engageable and movable toward the bore by a user, movement of the actuator resulting in movement of the engagement members away from a center of the bore, and
   wherein, when the wheel including the snap lock device receives the axle in the bore, the engagement members are biased inward to seat in the circumferential groove of the axle and to removably couple the wheel to the axle.

2. The cart wheel assembly of claim 1, wherein at least two of the plurality of apertures include a protrusion extending into the interior of the respective aperture, wherein at least one of the engagement member and the actuator rest on the protrusion when the snap lock device is installed in the wheel.

3. The cart wheel assembly of claim 1,
   wherein the spring includes an outer arm extending radially from the lower surface of the hubcap, a crossbar on the outer arm, a curved member connected to the outer arm, and an inner arm connected to the curved member, the inner arm terminating in a top end,
   wherein the engagement member and the actuator are coupled to the top end, and
   wherein the crossbar is located below the ramp when the snap lock device is installed in the wheel, the crossbar further securing the snap lock device in the wheel.

4. A snap lock device for mounting a wheel on an axle having a circumferential groove, the wheel defining a bore to receive the axle and a plurality of apertures for mounting the snap lock device to the wheel, the bore defining at least one opening, each of the apertures including a ramp extending into the apertures, the snap lock device comprising:
   a hubcap having a lower surface, the hubcap configured to cover at least two of the plurality of apertures when the snap lock device is installed in the wheel;
   a first clip extending from the lower surface of the hubcap and a second clip extending from the lower surface of the hubcap, wherein the first clip, the second clip, and the hubcap are formed as one integral piece; and
   the first clip and the second clip each including a spring directly coupled to the lower surface of the hubcap, each clip further including an engagement member coupled to the spring, each clip further including an actuator coupled to the spring and extending laterally from the hubcap,
   wherein the engagement member is adapted to fit into the axle groove, and
   wherein, when the snap lock device is mounted on the wheel,
      a portion of the spring of each clip is located below the ramp,
      the spring of each clip urges the engagement member into one of the at least one opening of the bore,
      the actuator of each clip is accessible by a user, and
      the actuator of each clip being engageable and movable toward the bore by a user, movement of the actuator resulting in movement of the engagement members away from a center of the bore.

5. The snap lock device of claim 4,
   wherein the spring includes an outer arm extending radially from the lower surface of the hubcap, a curved member connected to the outer arm, and an inner arm connected to the curved member, the inner arm terminating in a top end, and
   wherein the engagement member and the actuator are coupled to the top end.

6. The snap lock device of claim 5, wherein the spring includes a crossbar on the outer arm, the crossbar being located below the ramp when the snap lock device is installed in the wheel, the crossbar further securing the snap lock device in the wheel.

7. The snap lock device of claim 4, wherein the first and second clips are capable of producing an audible sound when the engagement members are first positioned into the circumferential groove of the axle.

8. The snap lock device of claim 4, wherein the engagement member includes at least one locating boss to position the engagement member in the bore.

9. The snap lock device of claim 4, wherein each aperture includes a protrusion extending toward the center of the aperture, wherein the engagement members and the actuators rest on the protrusion when the snap lock device is installed in the wheel.

10. The snap lock device of claim 9, wherein the engagement members include a tapered engagement surface and wherein the tapered engagement surface contacts the protrusion.

11. The snap lock device of claim 9, wherein the protrusion includes a projection extending from the surface of the protrusion toward the hubcap.

12. The snap lock device of claim 9, wherein each actuator includes a catch extending from the actuator toward the hubcap, wherein the catch secures the clip to the protrusion.

13. The snap lock device of claim 4, wherein each actuator includes a thinned section, wherein the thinned section provides a pivot for the actuator to move radially inward and radially outward.

14. The snap lock device of claim 11, wherein the thinned section is located adjacent the spring.

15. The snap lock device of claim 4, wherein each actuator includes a rib extending from a lever surface, wherein the rib strengthens the actuators and allows the actuators to maintain a substantially straight shape as they move radially inward and radially outward.

16. A method of tool-less installation of a snap lock device in a wheel on an axle having a circumferential groove, the wheel defining a bore to receive the axle and a plurality of apertures for mounting the snap lock device to the wheel, the method comprising:
   aligning a first clip and a second clip of the snap lock device with two of the plurality of apertures such that an engagement member of each clip rests on the bore, wherein each clip includes a spring coupled to the engagement member, and wherein each clip includes an actuator coupled to the spring;
   applying a first force on a hubcap of the snap lock device toward the wheel assembly, wherein the first force retracts the engagement members to the sides of the bore, and wherein the hubcap, the first clip, and the second clip are formed as one integral piece;
   applying a second force on the hubcap of the snap lock device toward the wheel assembly, wherein the second force moves the engagement members into position in an opening of the bore, wherein the second force positions a crossbar of the springs on a ramp in the aperture; and
   applying a third force on the hubcap of the snap lock device toward the wheel assembly, wherein the third force moves the crossbar below the ramp and seats the hubcap on the wheel.

17. The method of claim 16, wherein the first force, the second force, and the third force are applied in one motion.

18. The method of claim 16, wherein applying the third force causes the engagement members and the actuators to rest on a protrusion extending into the apertures.

19. A method of tool-less installation and removal of a wheel on an axle having a circumferential groove, the wheel defining a bore to receive the axle and a plurality of apertures, the method comprising:
   providing a snap lock device including a hubcap having a lower surface, a first clip extending from the lower surface, and a second clip extending from the lower surface, wherein the hubcap, the first clip, and the second clip are formed as one integrated member;
   installing the snap lock device in the wheel by inserting the first clip into one of the plurality of apertures and inserting the second clip into another of the plurality of apertures, wherein each clip includes an engagement member, wherein the engagement members are biased toward the center of the bore in an opening of the bore;
   positioning the wheel on the axle by receiving the axle into the bore so that the axle contacts the engagement members, wherein each clip includes a spring extending from a hubcap of the snap lock device and an actuator coupled to the spring and extending laterally away from the hubcap, and wherein each engagement member is attached to the corresponding spring; and
   coupling the wheel to the axle by applying force on the wheel toward the axle such that the engagement members retract and allow the axle to contact a terminating end of the bore, wherein the engagement members enter the bore and contact the circumferential groove of the axle.

20. The method of claim 19, wherein removal of the wheel from the axle includes:
   squeezing the actuators toward the bore, wherein squeezing the actuators causes the engagement members to retract from the circumferential groove;
   applying force on the wheel away from the axle, wherein applying force on the wheel removes the bore from the axle; and
   releasing the actuators, wherein releasing the actuators causes the engagement members to bias toward the center of the bore.

* * * * *